United States Patent
Sun et al.

(10) Patent No.: US 12,125,298 B2
(45) Date of Patent: Oct. 22, 2024

(54) EFFICIENT THREE-DIMENSIONAL OBJECT DETECTION FROM POINT CLOUDS

(71) Applicant: Waymo LLC, Mountain View, CA (US)

(72) Inventors: Pei Sun, Palo Alto, CA (US); Weiyue Wang, Sunnyvale, CA (US); Yuning Chai, San Mateo, CA (US); Xiao Zhang, Los Altos, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 304 days.

(21) Appl. No.: 17/527,653

(22) Filed: Nov. 16, 2021

(65) Prior Publication Data

US 2022/0156483 A1    May 19, 2022

Related U.S. Application Data (60) Provisional application No. 63/114,506, filed on Nov. 16, 2020.

(51) Int. Cl.
*G06V 20/64* (2022.01)
*G06T 7/194* (2017.01)

(52) U.S. Cl.
CPC .............. *G06V 20/64* (2022.01); *G06T 7/194* (2017.01); *G06T 2207/10028* (2013.01); *G06T 2207/20081* (2013.01); *G06T 2207/20084* (2013.01)

(58) Field of Classification Search
CPC ............ G06V 20/64; G06T 7/194; G06T 2207/10028; G06T 2207/20081; G06T 2207/20084

(Continued)

(56) References Cited

U.S. PATENT DOCUMENTS

2016/0035081 A1    2/2016  Stout et al.
2018/0348346 A1   12/2018  Vallespi-Gonzalez et al.
(Continued)

FOREIGN PATENT DOCUMENTS

WO    WO-2021097618 A1 *  5/2021

OTHER PUBLICATIONS

Wang, Ying, et al. "Edge extraction by merging the 3D point cloud and 2D image data." Automation, Communication and Cybernetics in Science and Engineering 2013/2014 (2014): 773-785. (Year: 2014).*

(Continued)

*Primary Examiner* — Jonathan S Lee
(74) *Attorney, Agent, or Firm* — Fish & Richardson P.C.

(57) ABSTRACT

Methods, computer systems, and apparatus, including computer programs encoded on computer storage media, for performing object detection. The system obtains a respective range image corresponding to each point cloud in a set of point clouds captured by one or more sensors. The system processes each range image using a segmentation neural network to generate range image features and a segmentation output. The system generates a feature representation of the set of point clouds from only the feature representations of the foreground points. The system processes the feature representation of the set of point clouds using a prediction neural network to generate a prediction characterizing the set of point clouds.

20 Claims, 4 Drawing Sheets

(58) Field of Classification Search
USPC .......................................................... 382/103
See application file for complete search history.

(56) References Cited

U.S. PATENT DOCUMENTS

| | | | |
|---|---|---|---|
| 2019/0057507 A1 | 2/2019 | El-Khamy et al. | |
| 2019/0279368 A1 | 9/2019 | Feng et al. | |
| 2019/0310378 A1 | 10/2019 | Ho | |

OTHER PUBLICATIONS

Abadi et al., "Tensorflow: A system for large-scale machine learning," 12th USENIX Symposium on Operating Systems Design and Implementation, Nov. 2016, pp. 265-283.
Bewley et al., "Range conditioned dilated convolutions for scale invariant 3D object detection," CoRR, May 2020, arXiv:2005.09927, 16 pages.
blog.waymo.com [online], "Designing the 5th-generation Waymo Driver," Mar. 26, 2020, retrieved on Feb. 11, 2022, retrieved from URL<https://blog.waymo.com/2020/03/designing-5th-generation-waymo-driver.html/>, 5 page.
Chen et al., "Multi-view 3d object detection network for autonomous driving," Proceedings of the IEEE Conference on Computer Vision and Pattern Recognition, 2017, pp. 1907-1915.
Cheng et al., "Improving 3D object detection through progressive population based augmentation," European Conference on Computer Vision, Nov. 2020, pp. 279-294.
Dai et al., "R-FCN: Object detection via region-based fully convolutional networks," Advances in neural information processing systems 29, 2016, pp. 379-387.
Engelcke et al., "Vote3deep: Fast object detection in 3D point clouds using efficient convolutional neural networks," 2017 IEEE International Conference on Robotics and Automation, May 2017, pp. 1355-1361.
Ge et al., "AFDet: Anchor free one stage 3D object detection," CoRR, Jun. 2020, arXiv:2006.12671, 10 pages.
Girshick et al., "Fast r-cnn," Proceedings of the IEEE International Conference on Computer Vision, 2015, pp. 1440-1448.
Girshick et al., "Rich feature hierarchies for accurate object detection and semantic segmentation," Proceedings of the IEEE Conference on Computer Vision and Pattern Recognition, 2014, pp. 580-587.
Graham et al., "Submanifold sparse convolutional networks," CoRR, Jun. 2017, arXiv:1706.01307, 10 pages.
Guizilini et al., "3D packing for self-supervised monocular depth estimation," Proceedings of the IEEE/CVF Conference on Computer Vision and Pattern Recognition, 2020, pp. 2485-2494.
He et al., "Deep residual learning for image recognition," Proceedings of the IEEE Conference on Computer Vision and Pattern Recognition, Jun. 2016, pp. 770-778.
International Search Report and Written Opinion in International Appln. No. PCT/US2021/059503, dated Mar. 4, 2022, 9 pages.
Ioffe et al., "Batch normalization: Accelerating deep network training by reducing internal covariate shift," Proceedings of the 32nd International Conference on Machine Learning, 2015, 37:448-456.
Kingma et al., "Adam: A method for stochastic optimization," CoRR, Dec. 2014, arXiv: 1412.6980, 15 pages.
Lang et al., "Pointpillars: Fast encoders for object detection from point clouds," Proceedings of the IEEE/CVF Conference on Computer Vision and Pattern Recognition, 2019, pp. 12697-12705.
Law et al., "Cornernet: Detecting objects as paired keypoints," Proceedings of the European Conference on Computer Vision, 2018, pp. 734-750.
Lei Ba et al., "Layer normalization," CoRR, Jul. 2016, arXiv: 1607.06450, 14 pages.

Lin et al., "Focal loss for dense object detection," Proceedings of the IEEE international conference on computer vision, 2017, pp. 2980-2988.
Liu et al., "Ssd: Single shot multibox detector," European Conference on Computer Vision, Sep. 2016, pp. 21-37.
Meyer et al., "Lasernet: An efficient probabilistic 3D object detector for autonomous driving," Proceedings of the IEEE/CVF Conference on Computer Vision and Pattern Recognition, 2019, pp. 12677-12686.
Ngiam et al., "Starnet: Targeted computation for object detection in point clouds," CoRR, Aug. 2019, arXiv: 1908.11069, 12 pages.
Qi et al., "Deep hough voting for 3d object detection in point clouds," Proceedings of the IEEE/CVF International Conference on Computer Vision, 2019, pp. 9277-9286.
Qi et al., "Frustum pointnets for 3d object detection from rgb-d data," Proceedings of the IEEE conference on computer vision and pattern recognition, 2018, pp. 918-927.
Qi et al., "Pointnet: Deep learning on point sets for 3D classification and segmentation," Proceedings of the IEEE Conference on Computer Vision and Pattern Recognition, 2017, pp. 652-660.
Redmon et al., "You only look once: Unified, real-time object detection," Proceedings of the IEEE conference on computer vision and pattern recognition, 2016, pp. 779-788.
Ren et al., "Faster r-cnn: Towards real-time object detection with region proposal networks," Advances in Neural Information Processing Systems 28, 39(6):1137-1149.
Ronneberger et al., "U-Net: Convolutional Networks for Biomedical Image Segmentation," International Conference on Medical Image Computing and Computer-Assisted Intervention, Nov. 2015, pp. 234-241.
Ruizhongtai et al., "Pointnet++: Deep hierarchical feature learning on point sets in a metric space," Advances in Neural Information Processing Systems 30, 2017, 10 pages.
Shi et al., "Pointrcnn: 3D object proposal generation and detection from point cloud," Proceedings of the IEEE/CVF Conference on Computer Vision and Pattern Recognition, 2019, pp. 770-779.
Shi et al., "Pv-rcnn: Pointvoxel feature set abstraction for 3D object detection," Proceedings of the IEEE/CVF Conference on Computer Vision and Pattern Recognition, 2020, pp. 10529-10538.
Shi et al., "Pv-rcnn: The top-performing lidar-only solutions for 3D detection/3d tracking/domain adaptation of waymo open dataset challenges," CoRR, Aug. 2020, arXiv:2008.12599, 4 pages.
Simon et al., "Complex-yolo: Real-time 3d object detection on point clouds," CORR, Mar. 2018, arXiv: 1803.06199, 14 pages.
Sun et al., "Scalability in perception for autonomous driving: Waymo open dataset," Proceedings of the IEEE/CVF Conference on Computer Vision and Pattern Recognition, 2020, pp. 2446-2454.
Wang et al., "Pillarbased object detection for autonomous driving," European Conference on Computer Vision, Nov. 2020, pp. 18-34.
Yan et al., "Second: Sparsely embedded convolutional detection," Sensors, 2018, 18(10):3337.
Yang et al., "Pixor: Real-time 3D object detection from point clouds," Proceedings of the IEEE conference on Computer Vision and Pattern Recognition, 2018, pp. 7652-7660.
Yang et al., "Std: Sparse-to-dense 3d object detector for point cloud," Proceedings of the IEEE International Conference on Computer Vision, 2019, pp. 1951-1960.
Zhou et al., "End-to-end multi-view fusion for 3d object detection in lidar point clouds," Proceedings of the Conference on Robot Learning, 2020, 100:923-932.
Zhou et al., "Objects as points," CoRR, Apr. 2019, arXiv:1904.07850, 12 pages.
Zhou et al., "Voxelnet: End-to-end learning for point cloud based 3D object detection," Proceedings of the IEEE Conference on Computer Vision and Pattern Recognition, 2018, pp. 4490-4499.

* cited by examiner

EFFICIENT THREE-DIMENSIONAL OBJECT DETECTION FROM POINT CLOUDS

CROSS-REFERENCE TO RELATED APPLICATION

This application claims priority to U.S. Provisional Patent Application No. 63/114,506, filed on Nov. 16, 2020, the disclosure of which is hereby incorporated by reference in its entirety.

BACKGROUND

This specification relates to processing point clouds using neural networks to detect objects in an environment.

Detecting objects in an environment is a task required for motion planning, e.g., by an autonomous vehicle.

Autonomous vehicles include self-driving cars, boats, and aircraft. Autonomous vehicles use a variety of onboard sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an onboard camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on the input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes methods, computer systems, and apparatus, including computer programs encoded on computer storage media, for performing three-dimensional (3D) object detection from a set of one or more point clouds.

In one innovative aspect, the specification describes a method for performing object detection. The method is implemented by a system including one or more computers. The system obtains a respective range image corresponding to each point cloud in a set of point clouds captured by one or more sensors. Each point cloud includes a respective plurality of three-dimensional points. Each range image includes a plurality of pixels, wherein each pixel in the range image (i) corresponds to one or more points in the corresponding point cloud and (ii) has at least a range value that indicates a distance of the corresponding one or more points for the pixel in the corresponding point cloud to the one or more sensors. The system processes each range image using a segmentation neural network that is configured to, for each range image, generate (i) range image features for the pixels in the range image and (ii) a segmentation output that indicates, for each of the pixels in the range image, whether the pixel is a foreground pixel or a background pixel. The system generates, for each foreground point in the set of point clouds, a feature representation of the foreground point from at least the range image features for the pixel corresponding to the foreground point. A foreground point is a point that corresponds to a pixel that the corresponding segmentation output indicates is a foreground pixel. The system generates a feature representation of the set of point clouds from only the feature representations of the foreground points. The system processes the feature representation of the set of point clouds using a prediction neural network to generate a prediction characterizing the set of point clouds.

In some implementations of the method, the prediction is an object detection prediction that identifies regions of the set of point clouds that are likely to be measurements of objects. The object detection prediction can include (i) a heatmap over locations in the point clouds and (ii) parameters of a plurality of bounding boxes.

In some implementations of the method, the segmentation neural network has been trained to generate segmentation outputs that have high recall and acceptable precision.

In some implementations of the method, the segmentation neural network is configured to apply a 1×1 convolution to the range image features to generate the segmentation output.

In some implementations of the method, the segmentation output includes a respective foreground score for each of the pixels, and wherein pixels indicated as foreground pixels are those pixels that have foreground scores that exceed a threshold value.

In some implementations of the method, for generating the feature representation of the set of point clouds, the system performs voxelization to voxelize the foreground points into a plurality of voxels, generates a respective representation of each of the voxels from the feature representations of the points assigned to the voxel, and processes the representations of the voxels using a sparse convolutional neural network to generate the feature representation of the set of point clouds. The voxelization can be a pillar-style voxelization and the sparse convolutional neural network is a 2D sparse convolutional neural network. Alternatively, the voxelization can be a 3D voxelization and the sparse convolutional neural network is a 3D sparse convolutional neural network.

In some implementations of the method, the set of point clouds includes a plurality of point clouds captured at different time points, and prior to performing voxelization, the system generates a transformed point cloud by, for each point cloud other than the point cloud at the most recent time point, transforming each foreground point in the point cloud into the point cloud at the most recent time point, and performs voxelization on the transformed point cloud. For each point cloud, the system can append an identifier of the time point at which the point cloud was captured to the feature representations of the foreground points in the point cloud.

This specification also provides a system including one or more computers and one or more storage devices storing instructions that when executed by the one or more computers cause the one or more computers to perform the method described above.

This specification also provides one or more computer storage media storing instructions that when executed by one or more computers, cause the one or more computers to perform the method described above.

The subject matter described in this specification can be implemented in particular embodiments so as to realize one or more of the following advantages.

Detecting objects in an environment is a task required for motion planning, e.g., by an autonomous vehicle. Numerous techniques have been developed for detecting objects, such as other vehicles, pedestrians, cyclists, and so on, from sensor measurement data, e.g., from LiDAR data.

In general, grid-based methods divide the 3D space into voxels or pillars. Dense convolutions can be applied to the grid to extract features. However, this approach is inefficient for large grids which are needed for long-range sensing or small object detection. Sparse convolutions scale better to large detection ranges but are usually slow due to the inefficiencies of applying the convolutions to all points. Range image based methods perform convolutions directly over the range image in order to extract point cloud features. Such models scale well with distance, but tend to perform less well in occlusion handling, accurate object localization, and for size estimation.

To address the shortcomings of existing approaches, this specification describe a technique that improves the efficiency and accuracy of object prediction.

For example, the initial stage of processing is optimized to rapidly discriminate foreground from background points, allowing a lightweight 2D image backbone to be applied to the range image at full resolution. As another example, the downstream sparse convolution processing is only applied on points that are likely to belong to a foreground object, which leads to additional, significant savings in compute. Furthermore, the system can use the foreground segmentation network to independently process each frame of a temporal sequence of range images in a streaming fashion, and fuse the segmented foreground points from frames within a time window to further improve the efficiency and accuracy of object detection.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
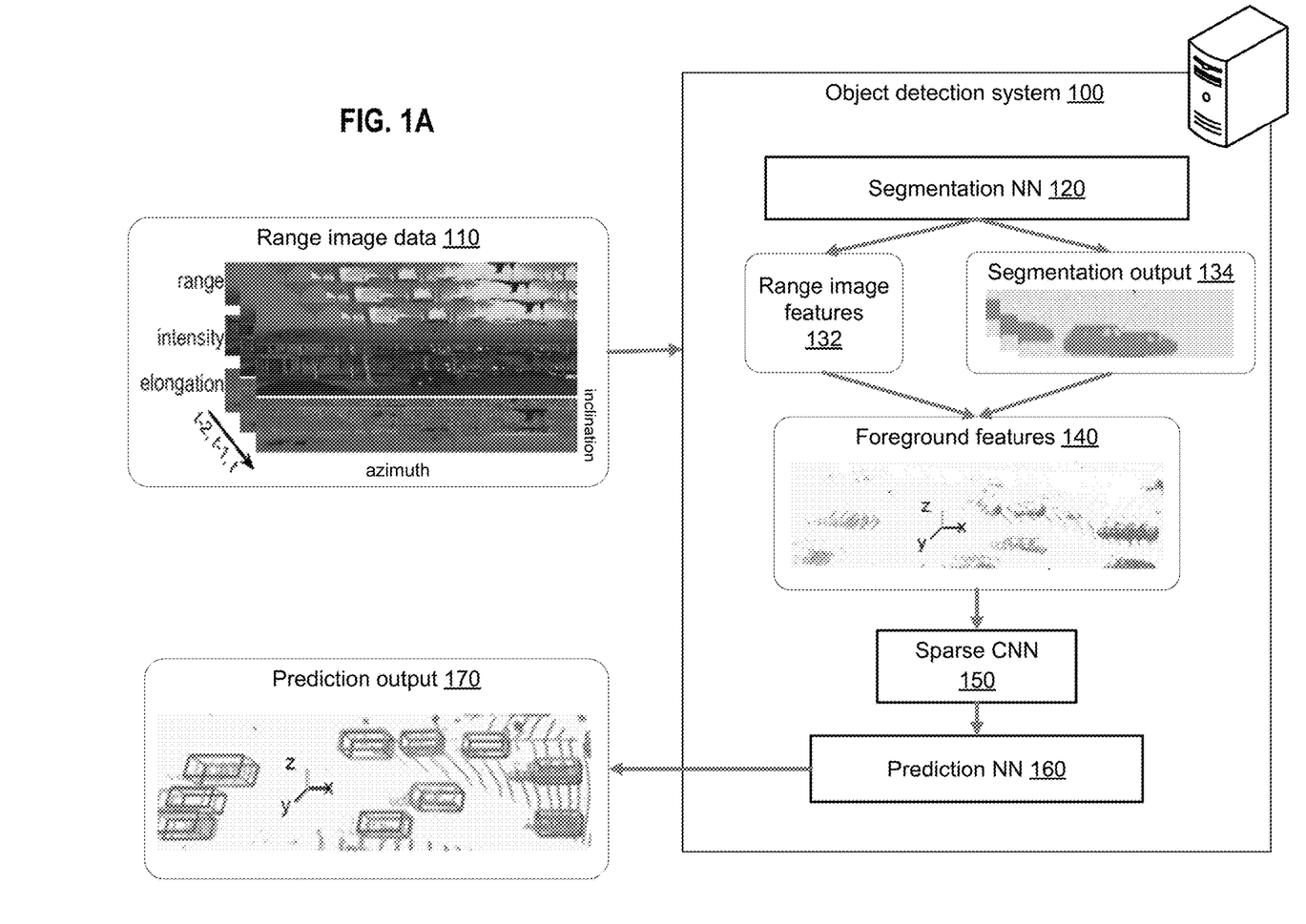
FIG. 1A shows an example object detection system.

FIG. 1A shows an example of an object detection system 100. The system 100 is an example of a system implemented as computer programs on one or more computers in one or more locations, in which the systems, components, and techniques described below can be implemented.

In general, the system 100 performs three-dimensional (3D) object detection on a set of one or more point clouds. For example, the object detection may be performed by an on-board computer system of an autonomous vehicle navigating through the environment and the point clouds may be generated by one or more sensors of the autonomous vehicle, e.g., a Lidar sensor. A planning system of the vehicle can use the object detections to make planning decisions to plan a future trajectory of the vehicle, e.g., by generating or modifying the future trajectory to avoid collisions with any of the detected objects.

As an input, the system 100 obtains range image data 110 for a set of point clouds. The range image data includes a respective range image corresponding to each point cloud in the set of point clouds.

Each point cloud in the set includes multiple points that represent a sensor measurement of a scene in an environment captured by one or more sensors. For example, the one or more sensors can be sensors, e.g., LiDAR sensors or other sensors that are considered to detect reflections of laser light, of a robotic agent or an autonomous vehicle, e.g., a land, air, or sea vehicle, and the scene can be a scene that is in the vicinity of the autonomous vehicle.

When there are multiple point clouds in the set, the point clouds can be arranged in a temporal sequence. The sequence is referred to as a temporal sequence because the point clouds are arranged according to the order in which the corresponding sensor measurements were generated.

Range images are dense representations of the 3D point clouds. Each range image includes a plurality of pixels. Each pixel in the range image corresponds to one or more points in the corresponding point cloud. Each range image pixel has at least a range value that indicates a distance of the corresponding one or more points for the pixel in the corresponding point cloud to the one or more sensors.

The pixels in each range image can be arranged in a two-dimensional (2D) grid. In one particular example, one dimension of the 2D grid corresponds to the azimuth angles ($\varphi$'s) of the corresponding points in the point cloud, and the other dimension of the 2D grid corresponds to inclinations ($\theta$'s) of the corresponding points. Each range image pixel has at least a range value that indicates the distance r of the corresponding point. The pixels in the range image can also include other values, e.g., intensity or elongation or both, for each of the pixels that represent other properties captured by the sensor for the corresponding point.

The goal of the object detection performed by the system 100 is to generate a prediction output 170 that includes data indicating detected objects from the measurement data, e.g., from LiDAR data.

The system 100 first applies a segmentation neural network 120 (e.g., a lightweight 2D convolutional network) to efficiently extract features from the range images and to perform a preliminary object segmentation. In a subsequent stage, the system uses a sparse convolutional neural network 150 to apply sparse convolution on image features of only the foreground voxels (as predicted by the segmentation neural network 120), in order to accurately predict the 3D object labels.

The segmentation neural network 120 is configured to, for each range image, generate range image features 132 for the pixels in the range image and a segmentation output 134 that indicates, for each of the pixels in the range image, whether the pixel is a foreground pixel or a background pixel. For example, in some implementations, the segmentation neural network 120 is configured to generate the segmentation output 134 from the range image features 132 by applying a convolution layer, e.g., a 1×1 convolution, to the range image features 132 to generate the segmentation output 134.

In some implementations, the segmentation output 134 includes a respective foreground score for each of the pixels in the range image. Those pixels that have foreground scores that exceed a threshold value can be indicated as foreground pixels in the range images. The foreground pixels in a respective range image correspond to foreground points, i.e., points corresponding to detected objects, in the point cloud corresponding to the respective range image.

As described above, the system 100 applies the segmentation neural network 120 to the range images to extract features and to identify the foreground pixels. The system then processes the learned features and identified foreground pixels in subsequent steps to generate the prediction output that characterizes the point clouds, e.g., to generate object labels for object detected based on the point clouds.

In some implementations of the techniques provided by this specification, unlike conventional semantic segmentation methods, recall is emphasized over high precision in training the segmentation neural network 120, since false positives can be removed in the subsequent processing but false negatives cannot easily be recovered. That is, the segmentation neural network 120 is trained to generate segmentation outputs 134 that have high recall and acceptable precisions, to ensure a greater likelihood that ground-truth object locations are predicted by the segmentation outputs 134.

The segmentation neural network can take any appropriate architecture, such as a 2D convolutional neural network. An example network architecture of the segmentation neural network 120 is discussed in detail with reference to FIG. 1B.

Based on the range image features 132 and the segmentation output 134, the system 100 can generate foreground features 140, i.e., feature representations for foreground points in the point clouds. That is, the system 100 generates, for each foreground point in the set of point clouds, a feature representation of the foreground point from at least the range image features for the pixel corresponding to the foreground point.

For each range image, the system 100 can identify the foreground points in the range image based on the segmentation output 134, e.g., based on the foreground scores for the pixels of the range image. The system 100 can identify the pixels with foreground scores exceeding the threshold value as the foreground pixels. The foreground points are points in the point cloud that correspond to detected objects, such as vehicles, pedestrians, cyclists, and so on, in the scene according to the sensor data.

Each feature representation of the corresponding foreground point includes the range image feature generated by the segmentation neural network 120. In some implementations, when there is a temporal sequence of the point clouds, the feature representation can also include time point information for the frame. In some implementations, the feature representation can also include statistics of the point cloud.

In some implementations, the set of point clouds includes a plurality of point clouds captured at different time points, and the point clouds are captured by measurements conducted by a moving sensor (e.g., a LiDAR configured on a moving vehicle). The system 100 can remove the effect of sensor ego-motion from the feature representations for the foreground points before downstream processing. Generally, removing ego-motion directly from the range images is not optimal because range reconstructions at a different frame result in non-trivial quantization errors. Instead, the system 100 of this specification removes the effect of ego-motion from the foreground points in the point clouds. Concretely, the system 100 can generate transformed point clouds by, for each point cloud other than the point cloud at the most recent time point, transforming each foreground point in the point cloud into the point cloud at the most recent time point.

In some implementations, the object detection system 100 includes multiple segmentation neural network 120 as multiple parallel branches for processing a set of multiple respective frames of range images that are collected at multiple time points within a time windows. The multiple segmentation neural network 120 share a same set of network parameters, and are jointly trained during training of the neural networks. During inference, only the last frame of the set of multiple frames of range images is processed by a single branch of the segmentation neural network 120, and the system re-use previous results for the other frames in the set. After the segmentation branches, the system 100 performs the transformation to remove sensor ego-motion from the different frames of segmented foreground points, and gathers the transformed foreground points from different frames to multiple set of points. By using the segmentation network to independently process each frame of a temporal sequence of range images in a streaming fashion, and fusing the segmented foreground points from frames within a time window, the system can further improve the efficiency and accuracy of object detection.

In one particular implementation, based on the extracted features 132 and the segmentation output 134 generated by the segmentation neural network 120, the system can gather points to multiple sets of points $P_{\delta_i}$, where $\delta_i$ is the frame time difference between frame 0 (latest, i.e., most recently captured point cloud) and frame i. The feature representation for each point p in $P_{\delta_i}$ includes the features extracted by segmentation neural network 120, and is augmented with p−m, var, p−c, and $\delta_i$, where p is the positional vector of the point, m and var are the arithmetic mean and covariance of the positional vectors of all points in the point cloud, respectively, and c is the positional vector of the center point in the point cloud.

By generating the feature representations only for foreground points predicted by the segmentation neural network, the system 100 reduces the point cloud data to only points most likely to belong to an object for subsequent processing.

To prepare for the sparse convolution, the system can perform voxelization to voxelize the foreground points into a plurality of voxels, and generate a respective representation of each voxel from the feature representations of the points assigned to the voxel.

In general, voxelization maps a point cloud into a grid of voxels. In some implementations, the voxelization is 3D voxelization that maps the point cloud into a 3D grid of voxels. For example, the system can map the point cloud into an evenly spaced grid of voxels with a voxel size $\Delta_{x,y,z}$.

In some implementations, the voxelization is a pillar-style voxelization that maps the point cloud to a 2D grid of voxels. The pillar style voxelization is described in "PointPillars: Fast Encoders for Object Detection from Point Clouds," arXiv:1812.05784 [cs.LG], 2018. For the pillar style voxelization, the voxel size in the z dimension $\Delta_z$ is set to $+\infty$.

The system 100 then processes the representations of the voxels using the sparse convolutional neural network 150 to generate the feature representation of the set of point clouds.

The sparse convolutional neural network 150 can be a 2D sparse convolutional neural network when the voxelization is a pillar-style voxelization or a 3D sparse convolutional neural network when the voxelization is a 3D voxelization.

The sparse convolutional neural network 150 can take any appropriate network architectures for a specific application. Examples of the sparse convolutional neural network are described in detail with reference to FIG. 1C.

The system 100 then uses the output features from the sparse convolutional neural network 150 to accurately generate 3D object labels. In particular, the system processes the feature representation of the set of point clouds using a prediction neural network 160 to generate a prediction output 170 characterizing the set of point clouds.

In some implementations, the prediction output 170 is an object detection prediction that identifies regions of the set of point clouds that are likely to be measurements of objects. In one particular example, the object detection prediction includes a heatmap over locations in the point clouds and parameters of a plurality of bounding boxes that correspond to locations and geometries of detected objects.

In one particular example, based on the feature representations generated for the point clouds, the system can form a feature map on voxelized coordinates $\tilde{V}=\{\tilde{v}|\tilde{v}\in R^d\}$, where $d\in\{2,3\}$ depending on whether 2D or 3D feature extraction has been performed. The system can process the feature map, as an input, with the prediction neural network 150 to generate the heatmap of the point clouds. The heatmap corresponds to a spatial distribution of the likelihood of objects, such as vehicles, pedestrians, and cyclists, being detected at the locations. The prediction neural network 150 can also be configured to generate parameters for each predicted bounding box, including, e.g., center location $\{x,y,z\}$, dimensions $\{l,w,h\}$, and the heading direction $\theta$.

The prediction neural network can adopt any appropriate network architectures. In one particular example, a modified CenterNet similar to as described in "Objects as points," arXiv: 1904.07850, 2019, can be used as the prediction neural network.

The system 100 or another system can perform training of the segmentation neural network 120, the sparse convolutional neural network 150, and the prediction network 160 based on training examples. In one example, the system can perform end-to-end training based on a total loss $$L=\lambda_1 L_{seg}+\lambda_2 L_{hm}+L_{box}$$

where $L_{seg}$ is a segmentation loss computed at the output of the segmentation neural network 120, and $L_{hm}$ and $L_{box}$ are heatmap and bounding box losses, respectively, computed at the output of the prediction neural network 160.

The segmentation loss can be computed as focal loss with ground truth labels derived from 3D bounding boxes by checking whether the corresponding pixel point is in any box with $$L_{seg} = \frac{1}{P}\sum_i L_i,$$

P is the total number of valid range image pixels. $L_i$ is the focal loss for point i. Points with foreground score $s_i$ greater than a threshold $\gamma$ are selected. The foreground threshold $\gamma$ is selected to achieve high recall and acceptable precision.

In some implementations, when only ground truth bounding boxes are available in the training examples, the ground truth heatmap can be computed for $\tilde{v}\in\tilde{V}$, for example, using:

$$h = \max\left\{\exp\left(-\frac{\|\tilde{v}-b_c\|-\|\tilde{V}-b_c\|}{\sigma^2}\right)\Big| b_c \in B_c(\tilde{v})\right\}$$

where $B_c(\tilde{v})$ is the set of centers of the boxes that contain $\tilde{v}$·h=0 if $|B_c(\tilde{v})|=0$. The heat map value h for the point $\tilde{v}$ is calculated depending on $\|\tilde{v}-b_c\|-\|\tilde{V}-b_c\|$, which is the distance between the point P and the circle placed at the box center be, with radius of the circle being the distance from the box center be to the closest point in V.

The heatmap loss $L^{hm}$ can be a focal loss:

$$L_{hm} = -\frac{1}{N}\sum_{\tilde{p}}\left\{(1-\tilde{h})^\alpha \log(\tilde{h})I_{h>1-\epsilon} + (1-h)^\beta \tilde{h}^\alpha \log(1-\tilde{h})I_{h\leq 1-\epsilon}\right\}$$

where $\tilde{h}$ and h are the predicted and ground truth heatmap values respectively. $\epsilon$ is added for numerical stability, and can be set to a small value, e.g., 1e-3.

The 3D bounding boxes can be parameterized as $b=\{d_x, d_y, d_z, l, w, h, \theta\}$ where $d_x$, $d_y$, $d_z$ are the box center offsets relative to the voxel centers. If 2D sparse convolutional neural network is used, $d_z$ can be set as the absolute box z center. l, w, h, $\theta$ are box length, width, height and box heading. A bin loss can be applied to regress heading 0. The other box parameters can be directly regressed under smooth L1 losses. IoU loss can be added to further boost box regression accuracy. Box regression losses are only active on the feature map pixels that have ground truth heatmap values greater than a threshold $\delta_1$:

$$L_{\theta_i} = L_{bin}(\theta_i, \tilde{\theta}_i),$$

$$L_{b_i\backslash\theta_i} = SmoothL1(b_i\backslash\theta_i - \tilde{b}_i\backslash\tilde{\theta}_i),$$

$$L_{box} = \frac{1}{N}\sum_i (L_{\theta_i} + L_{b_i\backslash\theta_i} + L_{iOB_i})I_{h_i>\delta_1},$$

where $\tilde{b}_i$, $b_i$ are the predicted and ground truth box parameters respectively, $\tilde{\theta}_i$, $\theta_i$ are the predicted and ground truth box heading respectively. $h_i$ is the ground truth heatmap value computed at feature map pixel i. The system can perform a sparse submanifold max-pooling operation on the sparse feature map voxels that have heatmap prediction greater than a threshold $\delta_2$, and select boxes corresponding to local maximum heatmap predictions.

Figure 1B:
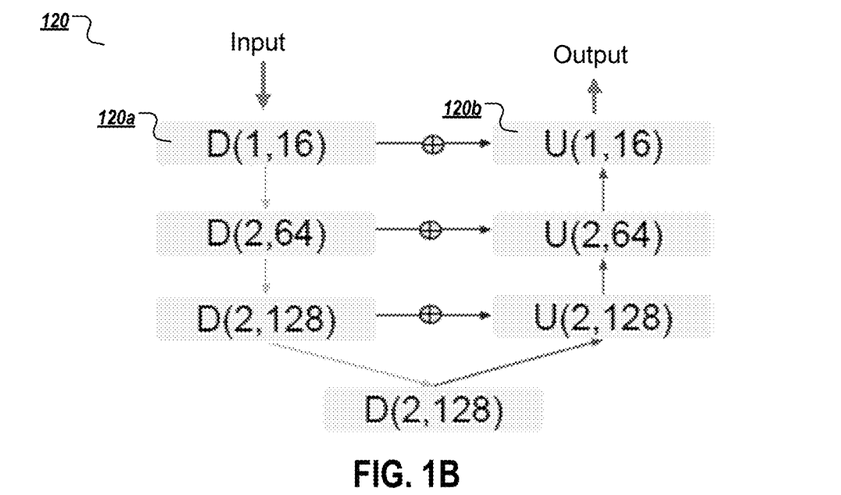
FIG. 1B illustrates an example of a foreground segmentation neural network.

FIG. 1B shows an example architecture of the segmentation neural network 120. In this example, the system adopts a U-shaped architecture that has a general shape that is similar to as described in "U-Net: Convolutional Networks for Biomedical Image Segmentation," arXiv: 1505.04597 [cs.CV], 2015.

As shown in FIG. 1B, the U-shaped segmentation neural network 120 includes a contracting path (left side) and an expansive path (right side). The contracting path includes down-sampling blocks 120a. Each down-sampling block 120a (represented by D(L,C)) includes L ResNet blocks each with C output channels.

The expansive path incudes up-sampling blocks 120b. Each up-sampling block 120b (represented by (L,C)) includes an up-sampling layer and L ResNet blocks. In one particular implementation, the up-sampling layer includes a 1×1 convolution followed by a bilinear interpolation.

Figure 1C:
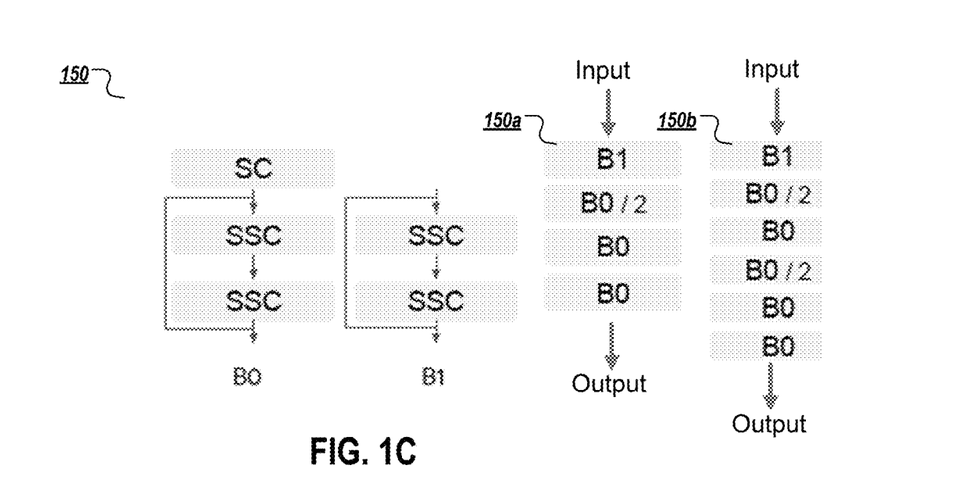
FIG. 1C shows examples of a sparse convolutional neural network.

FIG. 1C shows examples of network architectures of the sparse convolutional neural network 150. In particular, 150a shows an example network architecture for generating feature representations for detecting pedestrians from the foreground features, and 150b shows an example network architecture for generating feature representations for detecting vehicles from the foreground features.

Both networks 150a and 150b are constructed with blocks B0 and B1. Each of B0 and B1 includes several SC and SSC layers. The SC layer performs 3×3 or 3×3×3 sparse convolution with stride 1 or 2. The SSC layer performs a 3×3 or 3×3×3 submanifold sparse convolution. "/2" denotes stride 2.

Figure 2A:
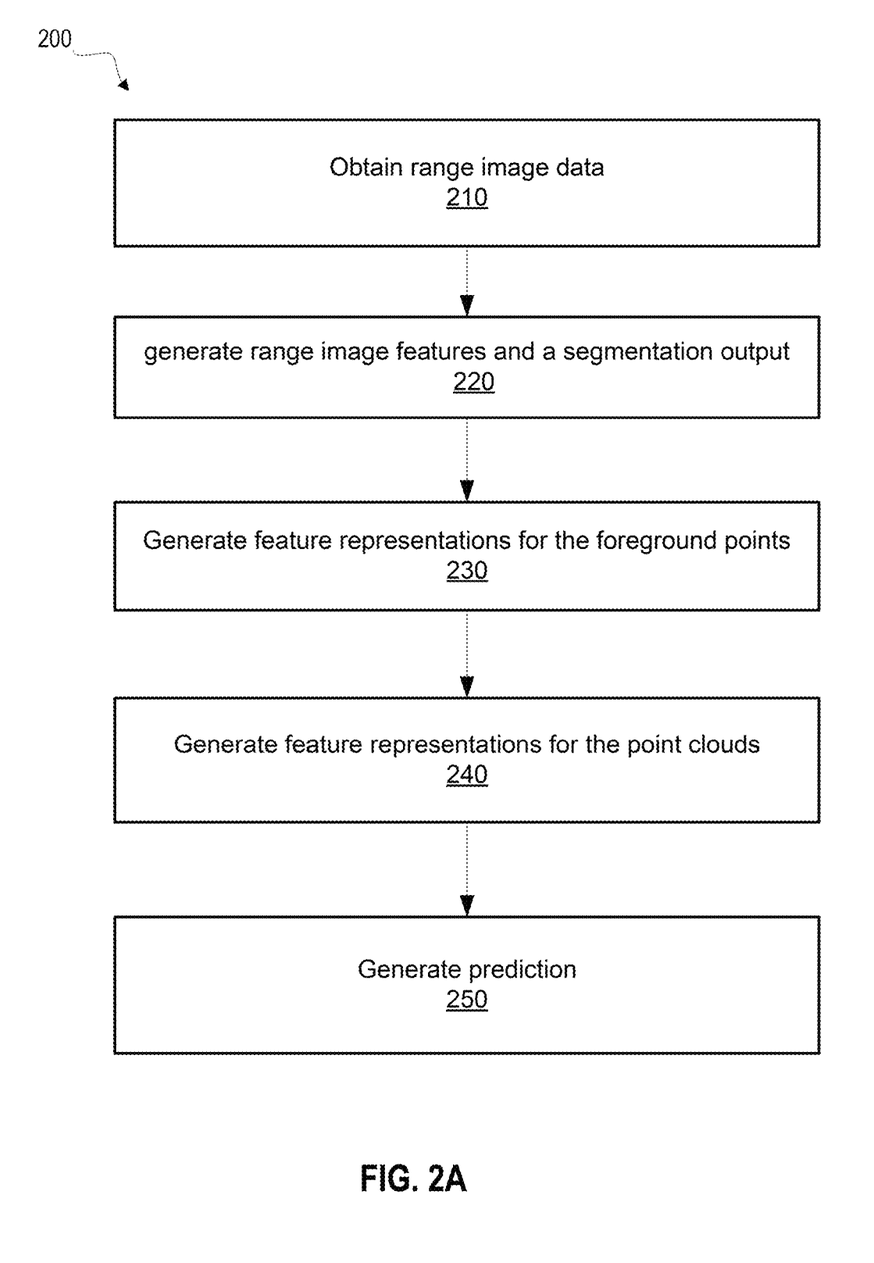
FIG. 2A is a flow diagram illustrating an example process for performing object detection from point cloud data.

FIG. 2A is a flow diagram illustrating an example process 200 for performing object detection from point clouds data. For convenience, the process 200 will be described as being performed by a system of one or more computers located in one or more locations. For example, an object detection system, e.g., the object detection system 100 of FIG. 1A, appropriately programmed in accordance with this specification, can perform the process 200.

In step 210, the system obtains range image data for a set of point clouds. The range image data includes a respective range image corresponding to each point cloud in the set of point clouds.

Each point cloud in the set includes multiple points that represent a sensor measurement of a scene in an environment captured by one or more sensors. For example, the one or more sensors can be sensors, e.g., LiDAR sensors or other sensors that are considered to detect reflections of laser light, of an autonomous vehicle, e.g., a land, air, or sea vehicle, and the scene can be a scene that is in the vicinity of the autonomous vehicle.

Each range image includes a plurality of pixels. Each pixel in the range image corresponds to one or more points in the corresponding point cloud. Each range image pixel has at least a range value that indicates a distance of the corresponding one or more points for the pixel in the corresponding point cloud to the one or more sensors.

When there are multiple point clouds in the set, the point clouds can be arranged in a temporal sequence. The sequence is referred to as a temporal sequence because the point clouds are arranged according to the order in which the corresponding sensor measurements were generated.

The pixels in the range image can also include other values, e.g., intensity or elongation or both, for each of the pixels that represent other properties captured by the sensor for the corresponding point.

In step 220, the system generates image features and a segmentation output from the range image data. Concretely, the system processes each range image using a segmentation neural network that is configured to, for each range image, generate the range image features for the pixels in the range image and a segmentation output that indicates, for each of the pixels in the range image, whether the pixel is a foreground pixel or a background pixel.

In some implementations, the segmentation neural network is configured to generate the segmentation output from the range image features, e.g., by applying a 1×1 convolution to the range image features to generate the segmentation output.

In some implementations, the segmentation output includes a respective foreground score for each of the pixels in the range image. Those pixels that have foreground scores that exceed a threshold value can be indicated as foreground pixels in the range images. The foreground pixels in a respective range image correspond to foreground points, i.e., points corresponding to detected objects, in the point cloud corresponding to the respective range image.

In step 230, the system generates feature representations for foreground points in the point clouds. That is, the system generates, for each foreground point in the set of point clouds, a feature representation of the foreground point from at least the range image features for the pixel corresponding to the foreground point.

Each feature representation of the corresponding foreground point includes the range image feature generated by the segmentation neural network. In some implementations, when there is a temporal sequence of the point clouds, the feature representation can also include time point information for the frame. In some implementations, the feature representation can also include voxel statics of the point cloud.

In step 240, the system generates feature representations for the set of point clouds. Concretely, the system generates a feature representation of the set of point clouds from only the feature representations of the foreground points.

An example process for generating the point cloud features is described in detail with reference to FIG. 2B. In general, the system can use a neural network, e.g., a sparse convolutional neural network, to process an input based on the predicted foreground voxels and their learned range image features. The output features from the neural network can be used in downstream processing to accurately generate 3D object labels.

In step 250, the system processes the feature representation of the set of point clouds using a prediction neural network to generate a prediction characterizing the set of point clouds.

In some implementations, the prediction is an object detection prediction that identifies regions of the set of point clouds that are likely to be measurements of objects. In one particular example, the object detection prediction includes a heatmap over locations in the point clouds and parameters of a plurality of bounding boxes that correspond to locations and geometries of detected objects.

Figure 2B:
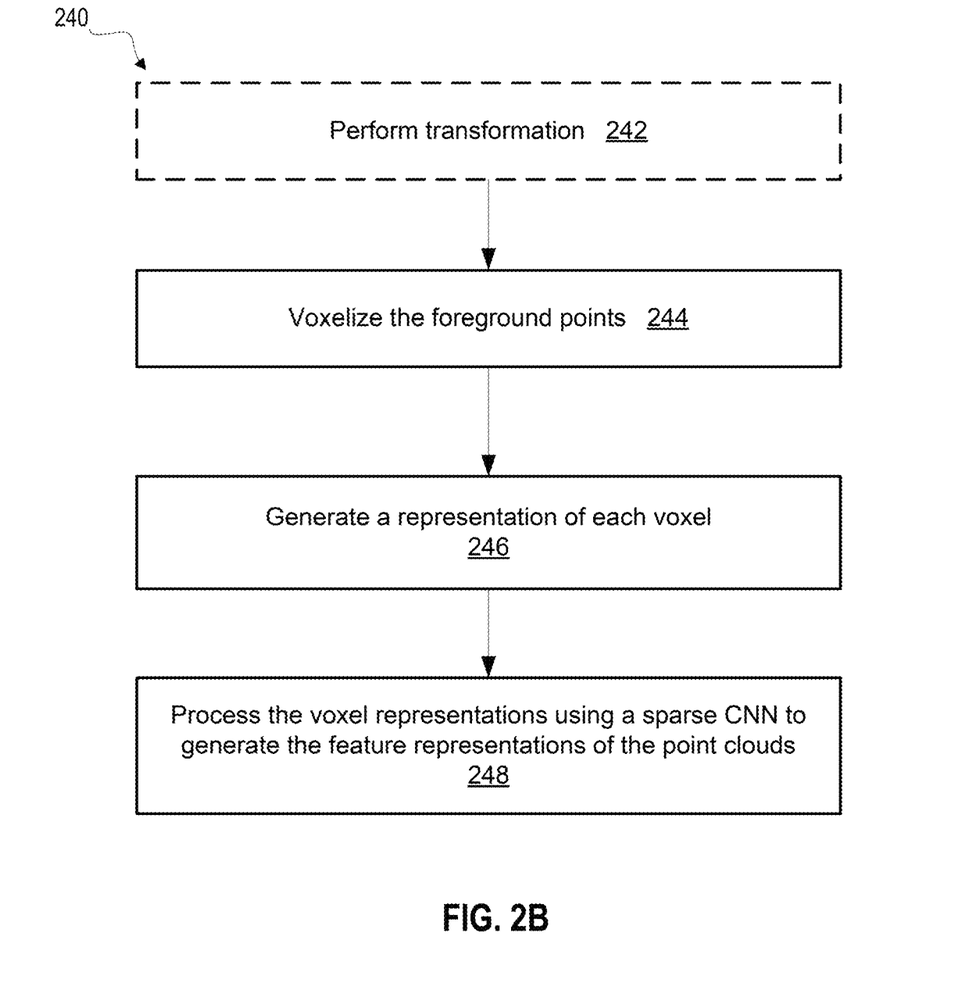
FIG. 2B is a flow diagram illustrating an example process for generating the feature representations for the point clouds.

FIG. 2B is a flow diagram illustrating an example process 240 for generating the feature representations for the point clouds. For convenience, the process 240 will be described as being performed by a system of one or more computers located in one or more locations. For example, an object detection system, e.g., the object detection system 100 of FIG. 1A, appropriately programmed in accordance with this specification, can perform the process 240.

The range images can be generated based on measurements conducted by a moving senor, e.g., a LiDAR configured on a moving vehicle. In these scenarios, stacking multiple range images without considering ego-motion may negatively impact the performance of prediction model. Thus, the system can optionally perform step 242 to remove the effect of ego-motion of the sensor from the foreground points in the point clouds.

Concretely, in step 242, when the set of point clouds includes a plurality of point clouds captured at different time points, the system generates a transformed point cloud by, for each point cloud other than the point cloud at the most recent time point, transforming each foreground point in the point cloud into the point cloud at the most recent time point.

In step 244, the system performs voxelization to voxelize the foreground points into a plurality of voxels. In some implementations, the voxelization is 3D voxelization that maps the point cloud into a 3D grid of voxels. In some implementations, the voxelization is a pillar-style voxelization that maps the point cloud to a 2D grid of voxels.

In step 246, the system generates a respective representation of each of the voxels from the feature representations of the points assigned to the voxel.

In step 248, the system processes the representations of the voxels using a sparse convolutional neural network to generate the feature representation of the set of point clouds.

The sparse convolutional neural network can be a 2D sparse convolutional neural network when the voxelization is a pillar-style voxelization. It is a 3D sparse convolutional neural network when the voxelization is a 3D voxelization.

The sparse convolutional neural network can take any appropriate network architectures for a specific application. Examples of sparse convolutional neural network are described in detail with reference to FIG. 1C.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining a respective range image corresponding to each point cloud in a set of point clouds captured by one or more sensors, wherein:
      each point cloud comprises a respective plurality of three-dimensional points,
      each range image comprising a plurality of pixels, wherein each pixel in the range image (i) corresponds to one or more points in the corresponding point cloud and (ii) has at least a range value that indicates a distance of the corresponding one or more points for the pixel in the corresponding point cloud to the one or more sensors;
   processing each range image using a segmentation neural network that is configured to, for each range image, generate (i) range image features for the pixels in the range image and (ii) a segmentation output that indicates, for each of the pixels in the range image, whether the pixel is a foreground pixel or a background pixel;
   generating, for each foreground point in the set of point clouds, a feature representation of the foreground point from at least the range image features for the pixel corresponding to the foreground point, wherein a foreground point is a point that corresponds to a pixel that the corresponding segmentation output indicates is a foreground pixel;

generating a feature representation of the set of point clouds from only the feature representations of the foreground points; and processing the feature representation of the set of point clouds using a prediction neural network to generate a prediction characterizing the set of point clouds.

2. The method of claim 1, wherein the prediction is an object detection prediction that identifies regions of the set of point clouds that are likely to be measurements of objects.

3. The method of claim 2, wherein the object detection prediction comprises (i) a heatmap over locations in the point clouds and (ii) parameters of a plurality of bounding boxes.

4. The method of claim 1, wherein the segmentation neural network has been trained to generate segmentation outputs that have high recall and acceptable precision.

5. The method of claim 1, wherein the segmentation neural network is configured to apply a 1×1 convolution to the range image features to generate the segmentation output.

6. The method of claim 1, wherein the segmentation output includes a respective foreground score for each of the pixels, and wherein pixels indicated as foreground pixels are those pixels that have foreground scores that exceed a threshold value.

7. The method of claim 1, wherein generating a feature representation of the set of point clouds from only the feature representations of the foreground points comprises:
performing voxelization to voxelize the foreground points into a plurality of voxels;
generating a respective representation of each of the voxels from the feature representations of the points assigned to the voxel; and
processing the representations of the voxels using a sparse convolutional neural network to generate the feature representation of the set of point clouds.

8. The method of claim 7, wherein the voxelization is pillar style voxelization and wherein the sparse convolutional neural network is a 2D sparse convolutional neural network.

9. The method of claim 7, wherein the voxelization is 3D voxelization and wherein the sparse convolutional neural network is a 3D sparse convolutional neural network.

10. The method of claim 7, wherein the set of point clouds includes a plurality of point clouds captured at different time points, and wherein generating a feature representation of the set of point clouds from only the feature representations of the foreground points comprises:
prior to performing voxelization, generating a transformed point cloud by, for each point cloud other than the point cloud at the most recent time point, transforming each foreground point in the point cloud into the point cloud at the most recent time point; and
performing voxelization on the transformed point cloud.

11. The method of claim 10, further comprising:
for each point cloud, appending an identifier of the time point at which the point cloud was captured to the feature representations of the foreground points in the point cloud.

12. A system comprising:
one or more computers; and
one or more storage devices storing instructions that, when executed by the one or more computers, cause the one or more computers to perform:
obtaining a respective range image corresponding to each point cloud in a set of point clouds captured by one or more sensors, wherein:
each point cloud comprises a respective plurality of three-dimensional points,
each range image comprising a plurality of pixels, wherein each pixel in the range image (i) corresponds to one or more points in the corresponding point cloud and (ii) has at least a range value that indicates a distance of the corresponding one or more points for the pixel in the corresponding point cloud to the one or more sensors;
processing each range image using a segmentation neural network that is configured to, for each range image, generate (i) range image features for the pixels in the range image and (ii) a segmentation output that indicates, for each of the pixels in the range image, whether the pixel is a foreground pixel or a background pixel;
generating, for each foreground point in the set of point clouds, a feature representation of the foreground point from at least the range image features for the pixel corresponding to the foreground point, wherein a foreground point is a point that corresponds to a pixel that the corresponding segmentation output indicates is a foreground pixel;
generating a feature representation of the set of point clouds from only the feature representations of the foreground points; and
processing the feature representation of the set of point clouds using a prediction neural network to generate a prediction characterizing the set of point clouds.

13. The system of claim 12, wherein the prediction is an object detection prediction that identifies regions of the set of point clouds that are likely to be measurements of objects.

14. The system of claim 12, wherein the segmentation neural network is configured to apply a 1×1 convolution to the range image features to generate the segmentation output.

15. The system of claim 12, wherein the segmentation output includes a respective foreground score for each of the pixels, and wherein pixels indicated as foreground pixels are those pixels that have foreground scores that exceed a threshold value.

16. The system of claim 12, wherein generating a feature representation of the set of point clouds from only the feature representations of the foreground points comprises:
performing voxelization to voxelize the foreground points into a plurality of voxels;
generating a respective representation of each of the voxels from the feature representations of the points assigned to the voxel; and
processing the representations of the voxels using a sparse convolutional neural network to generate the feature representation of the set of point clouds.

17. The system of claim 16, wherein the voxelization is pillar style voxelization and wherein the sparse convolutional neural network is a 2D sparse convolutional neural network.

18. One or more non-transitory computer-readable storage media storing instructions that when executed by one or more computers cause the one or more computers to perform:

obtaining a respective range image corresponding to each point cloud in a set of point clouds captured by one or more sensors, wherein:
  each point cloud comprises a respective plurality of three-dimensional points,
  each range image comprising a plurality of pixels, wherein each pixel in the range image (i) corresponds to one or more points in the corresponding point cloud and (ii) has at least a range value that indicates a distance of the corresponding one or more points for the pixel in the corresponding point cloud to the one or more sensors;
processing each range image using a segmentation neural network that is configured to, for each range image, generate (i) range image features for the pixels in the range image and (ii) a segmentation output that indicates, for each of the pixels in the range image, whether the pixel is a foreground pixel or a background pixel;
generating, for each foreground point in the set of point clouds, a feature representation of the foreground point from at least the range image features for the pixel corresponding to the foreground point, wherein a foreground point is a point that corresponds to a pixel that the corresponding segmentation output indicates is a foreground pixel;
generating a feature representation of the set of point clouds from only the feature representations of the foreground points; and
processing the feature representation of the set of point clouds using a prediction neural network to generate a prediction characterizing the set of point clouds.

19. The non-transitory computer-readable storage media of claim 18, wherein generating a feature representation of the set of point clouds from only the feature representations of the foreground points comprises:
  performing voxelization to voxelize the foreground points into a plurality of voxels;
  generating a respective representation of each of the voxels from the feature representations of the points assigned to the voxel; and
  processing the representations of the voxels using a sparse convolutional neural network to generate the feature representation of the set of point clouds.

20. The non-transitory computer-readable storage media of claim 19, wherein the voxelization is pillar style voxelization and wherein the sparse convolutional neural network is a 2D sparse convolutional neural network.

* * * * *